United States Patent
Quan et al.

(10) Patent No.: US 10,477,588 B2
(45) Date of Patent: Nov. 12, 2019

(54) METHOD OF PERFORMING RANDOM ACCESS ACCORDING TO A COVERAGE ENHANCEMENT LEVEL, AND EQUIPMENT THEREFOR

(71) Applicant: Huawei Technologies Co., Ltd., Shenzhen (CN)

(72) Inventors: Wei Quan, Beijing (CN); Jian Zhang, Beijing (CN); Zhenxing Hu, Shenzhen (CN); Bingzhao Li, Beijing (CN); Xiaodong Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 114 days.

(21) Appl. No.: 15/331,379

(22) Filed: Oct. 21, 2016

(65) Prior Publication Data

US 2017/0041960 A1   Feb. 9, 2017

Related U.S. Application Data

(63) Continuation of application No. PCT/CN2014/076031, filed on Apr. 23, 2014.

(51) Int. Cl.
*H04W 74/08* (2009.01)
*H04W 4/00* (2018.01)
(Continued)

(52) U.S. Cl.
CPC ......... *H04W 74/0833* (2013.01); *H04W 4/70* (2018.02); *H04W 48/12* (2013.01); *H04W 88/02* (2013.01)

(58) Field of Classification Search
CPC ... H04W 74/0833; H04W 4/70; H04W 4/005; H04W 48/12; H04W 88/02
See application file for complete search history.

(56) References Cited

U.S. PATENT DOCUMENTS

2010/0278064 A1   11/2010   Jeong
2013/0035084 A1   2/2013   Song et al.
(Continued)

FOREIGN PATENT DOCUMENTS

CN   101998585 A   3/2011
CN   103179670 A   6/2013
(Continued)

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 12); 3GPP TS 36.321 V12.1.0 (Mar. 2014), 57 pages.
3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.1.0 (Mar. 2014); 356 pages.
(Continued)

*Primary Examiner* — Robert C Scheibel
(74) *Attorney, Agent, or Firm* — Slater Matsil, LLP

(57) ABSTRACT

A method includes determining whether a first preset condition is met, where the first preset condition includes: a difference between a maximum transmit power allowed by the user equipment and a power of sending the random access code in a previous random access attempt process is less than or equal to a power ramping factor, and/or, the previous random access attempt process fails. The method also includes, if the first preset condition is met, sending the random access code using an enhancement mode in the current random access attempt process.

15 Claims, 3 Drawing Sheets

(51) Int. Cl.
 *H04W 48/12* (2009.01)
 *H04W 4/70* (2018.01)
 *H04W 88/02* (2009.01)

(56) References Cited

U.S. PATENT DOCUMENTS

| | | | |
|---|---|---|---|
| 2013/0083747 A1* | 4/2013 | Narasimha | H04W 74/0841 370/329 |
| 2013/0265866 A1* | 10/2013 | Yi | H04W 74/0841 370/216 |
| 2014/0098761 A1* | 4/2014 | Lee | H04W 74/006 370/329 |
| 2015/0016312 A1* | 1/2015 | Li | H04W 74/0833 370/280 |

FOREIGN PATENT DOCUMENTS

| | | |
|---|---|---|
| EP | 2187696 A1 | 5/2010 |
| WO | 2010104977 A1 | 9/2010 |
| WO | 2013109177 A1 | 7/2013 |

OTHER PUBLICATIONS

Alcatel-Lucent, et al., "PRACH Coverage Enhancement for MTC UE," 3GPP TSG-RAN WG1 Meeting #75, R1-135155, San Francisco, USA, Nov. 11-15, 2013, 8 pages.

Huawei, et al., "Considerations on PRACH repetition levels and power adjustment of PRACH transmission," 3GPP TSG RAN WG1 Meeting #76, R1-140026, Prague, Czech Republic, Feb. 10-14, 2014, 6 pages.

MediaTek Inc., "Discussion on PRACH and RACH procedure in coverage enhancement mode," 3GPP TSG-RAN WG1 #75, R1-135424, San Francisco, USA, Nov. 11-15, 2013, 6 pages.

Samsung, "PRACH Coverage Enhancements for MTC UEs," 3GPP TSG-RAN WG1?76, R1-140355, Prague, Czech Republic, Feb. 10-14, 2014, 6 pages.

Interdigital, "PRACH Coverage Enhancement for MTC UE," 3GPP TSG RAN WG1 Meeting #76 R1-140649, Prague, Czech Republic, Feb. 10-14, 2014, 3 pages.

NEC, "Random access procedure," 3GPP TSG-RAN WG2 Meeting #60bis, R2-080150, Seville, Spain, Jan. 14-18, 2008, 5 pages.

* cited by examiner

METHOD OF PERFORMING RANDOM ACCESS ACCORDING TO A COVERAGE ENHANCEMENT LEVEL, AND EQUIPMENT THEREFOR

CROSS-REFERENCE TO RELATED APPLICATIONS

This application is a continuation of International Application No. PCT/CN2014/076031, filed on Apr. 23, 2014, the disclosure of which is hereby incorporated by reference in its entirety.

TECHNICAL FIELD

Embodiments relate to mobile communication technologies, and in particular, to a random access method, a random access apparatus, and user equipment.

BACKGROUND

Internet of Things refers to a network of interaction between a person and a thing and between things by means of information transmission, synchronization, and processing over a network after information about a physical world is obtained by deploying various devices with capabilities of perception, calculation, execution, and communication. To research how to carry an Internet of Things application in a mobile communications network, the 3rd Generation Partnership Project (3GPP) proposes a machine-to-machine (M2M) communications technology and researches enhancement or optimization that is performed on the mobile communications network due to introduction of a machine type communication (MTC) device. For machine type communication, for example, an electricity meter, a water meter, and the like may be generally arranged in a place such as a building and a basement. Generally, a path transmission loss of a radio signal is relatively large in these places. To ensure normal communication of a device in such a scenario, a coverage enhancement technology is introduced to achieve an enhanced coverage objective.

Compared with a normal single transmission mode (in which no repeated sending is performed), an enhancement mode is a signal transmission mode in which a same signal or same content is retransmitted for multiple times. In a contention-based random access procedure, different machine type communication requires different repetition times. For example, to ensure reliability of a signal transmitted on each channel during random access, some machine type communication requires only 30 repetition times, some machine type communication requires 60 repetition times, some machine type communication requires 120 repetition times, and the like. Generally, the enhancement mode is divided into three levels, the coverage enhancement levels correspond to different repetition times, and for different machine type communication, different coverage enhancement levels may be selected. Likewise, repetition times required by different channels may also be different. For example, for same machine type communication, a physical downlink control channel (PDCCH) requires 30 repetition times, a physical downlink shared channel (PDSCH) may require 50 repetition times, and the like.

In the prior art, a terminal always uses one signal transmission mode, and signal transmission reliability is poor.

SUMMARY

Embodiments provide a random access method, a random access apparatus, and user equipment, which implements switching of signal transmission modes, and improves signal transmission reliability.

A first aspect of the embodiments provides a random access method. The method includes determining whether a first preset condition is met, where the first preset condition includes: a difference between a maximum transmit power allowed by user equipment and a power of sending the random access code in a previous random access attempt process is less than or equal to a power ramping factor, and/or, the previous random access attempt process fails. The method also includes, if the first preset condition is met, sending the random access code by using an enhancement mode in the current random access attempt process.

According to the first aspect, in a first possible implementation manner of the first aspect, the first preset condition further includes: the random access code is sent by using a single transmission mode in the previous random access attempt process.

According to the first aspect or the first possible implementation manner of the first aspect, in a second possible implementation manner of the first aspect, the sending the random access code by using an enhancement mode in the current random access attempt process includes: selecting a first enhancement level from enhancement levels of the enhancement mode, and sending the random access code according to a pre-obtained random access parameter corresponding to the first enhancement level, where the first enhancement level is an enhancement level corresponding to least signal retransmission times in the enhancement levels; or selecting, from enhancement levels of the enhancement mode, a next enhancement level of an enhancement level used in the previous random access attempt process, and sending the random access code according to a pre-obtained random access parameter corresponding to the next enhancement level, where signal retransmission times corresponding to the next enhancement level are more than signal retransmission times corresponding to the enhancement level used in the previous random access attempt process.

According to the first aspect and either of the first and the second possible implementation manners of the first aspect, in a third possible implementation manner of the first aspect, after the sending the random access code by using an enhancement mode in the current random access attempt process, the method further includes: using a random access response parameter pre-configured by the network device to attempt to receive a random access response message sent by the network device; and if the random access response message is not received, determining that the current random access procedure fails; or if the random access response message is successfully received, sending a scheduled transmission message to the network device by using a resource that is occupied by the scheduled transmission message and that is pre-configured by the network device; using a resource that is occupied by a contention resolution message and that is pre-configured by the network device to attempt to receive the contention resolution message indicating a random access success; and if the contention resolution message is not received, determining that the current random access procedure fails.

According to any one of the first aspect, or the first to the third possible implementation manners of the first aspect, in a fourth possible implementation manner of the first aspect, the method further includes: when a random access procedure is initiated for the first time, determining a signal transmission mode for sending the random access code, where the signal transmission mode is the single transmission mode or the enhancement mode; obtaining a random access parameter that corresponds to the determined signal transmission mode and that is pre-configured by the network device; and sending the random access code to the network device by using the obtained random access parameter.

According to the second possible implementation manner of the first aspect, in a fifth possible implementation manner of the first aspect, the random access parameter includes random access channel resource information; and after the selecting a first enhancement level from enhancement levels of the enhancement mode and before the sending the random access code according to a pre-obtained random access parameter corresponding to the first enhancement level, or after the selecting, from enhancement levels of the enhancement mode, a next enhancement level of an enhancement level used in the previous random access attempt process and before the sending the random access code according to a pre-obtained random access parameter corresponding to the next enhancement level, the method further includes: if the pre-obtained random access channel resource corresponding to the first enhancement level or the next enhancement level is available at a current moment, and the current moment is not a start moment of the random access channel resource corresponding to the first enhancement level or the next enhancement level, determining whether a preset policy is met; and if the preset policy is met, executing, at the current moment, the step of the sending the random access code according to a pre-obtained random access parameter corresponding to the first enhancement level or the next enhancement level.

According to the fifth possible implementation manner of the first aspect, in a sixth possible implementation manner of the first aspect, the preset policy includes: an interval between the current moment and the start moment of the random access channel resource corresponding to the first enhancement level or the next enhancement level is less than or equal to a first preset interval, where the first preset interval is fixed in a protocol or configured by the network device; or an interval between the current moment and an end moment of the random access channel resource corresponding to the first enhancement level or the next enhancement level is greater than or equal to a second preset interval, where the second preset interval is fixed in the protocol or configured by the network device.

A second aspect of the embodiments provides a random access apparatus, where the random access apparatus includes: a determining module, configured to determine whether a first preset condition is met, where the first preset condition includes: a difference between a maximum transmit power allowed by user equipment and a power of sending the random access code in a previous random access attempt process is less than or equal to a power ramping factor, and/or, the previous random access attempt process fails. The apparatus also includes a transceiver module, configured to: if the determining module determines that the first preset condition is met, send the random access code by using an enhancement mode in the current random access attempt process.

According to the second aspect, in a first possible implementation manner of the second aspect, the first preset condition further includes: the random access code is sent by using a single transmission mode in the previous random access attempt process.

According to the second aspect or the first possible implementation manner of the second aspect, in a second possible implementation manner of the second aspect, the transceiver module is specifically configured to: select a first enhancement level from enhancement levels of the enhancement mode, and send the random access code according to a pre-obtained random access parameter corresponding to the first enhancement level, where the first enhancement level is an enhancement level corresponding to least signal retransmission times in the enhancement levels; or select, from enhancement levels of the enhancement mode, a next enhancement level of an enhancement level used in the previous random access attempt process, and send the random access code according to a pre-obtained random access parameter corresponding to the next enhancement level, where signal retransmission times corresponding to the next enhancement level are more than signal retransmission times corresponding to the enhancement level used in the previous random access attempt process.

According to the second aspect and either of the first and the second possible implementation manners of the second aspect, in a third possible implementation manner of the second aspect, the transceiver module is further configured to: after the random access code is sent by using the enhancement mode in the current random access attempt process, use a random access response parameter pre-configured by the network device to attempt to receive a random access response message sent by the network device; and if the random access response message is not received, determine that the current random access procedure fails; or if the random access response message is successfully received, send a scheduled transmission message to the network device by using a resource that is occupied by the scheduled transmission message and that is pre-configured by the network device; use a resource that is occupied by a contention resolution message and that is pre-configured by the network device to attempt to receive the contention resolution message indicating a random access success; and if the contention resolution message is not received, determine that the current random access procedure fails.

According to any one of the second aspect, or the first to the third possible implementation manners of the second aspect, in a fourth possible implementation manner of the second aspect, the determining module is further configured to: when a random access procedure is initiated for the first time, determine a signal transmission mode for sending the random access code, where the signal transmission mode is the single transmission mode or the enhancement mode; obtain a random access parameter that corresponds to the determined signal transmission mode and that is pre-configured by the network device; and the transceiver module is further configured to send the random access code to the network device by using the obtained random access parameter.

According to the second possible implementation manner of the second aspect, in a fifth possible implementation manner of the second aspect, the random access parameter includes random access channel resource information; and the determining module is further configured to: after the first enhancement level is selected from the enhancement levels of the enhancement mode and before the random access code is sent according to the pre-obtained random access parameter corresponding to the first enhancement level, or after the next enhancement level of the enhancement level used in the previous random access attempt process is selected from the enhancement levels of the enhancement mode and before the random access code is sent according to the pre-obtained random access parameter corresponding to the next enhancement level, if the pre-obtained random access channel resource corresponding to the first enhancement level or the next enhancement level is available at a current moment, and the current moment is not a start moment of the random access channel resource corresponding to the first enhancement level or the next enhancement level, determine whether a preset policy is met; and if the preset policy is met, execute, at the current moment, the step of the sending the random access code according to a pre-obtained random access parameter corresponding to the first enhancement level or the next enhancement level.

According to the fifth possible implementation manner of the second aspect, in a sixth possible implementation manner of the second aspect, the preset policy includes: an interval between the current moment and the start moment of the random access channel resource corresponding to the first enhancement level or the next enhancement level is less than or equal to a first preset interval, where the first preset interval is fixed in a protocol or configured by the network device; or an interval between the current moment and an end moment of the random access channel resource corresponding to the first enhancement level or the next enhancement level is greater than or equal to a second preset interval, where the second preset interval is fixed in the protocol or configured by the network device.

A third aspect of the embodiments provides user equipment. The user equipment includes a processor, configured to determine whether a first preset condition is met, where the first preset condition includes: a difference between a maximum transmit power allowed by the user equipment and a power of sending the random access code in a previous random access attempt process is less than or equal to a power ramping factor, and/or, the previous random access attempt process fails. The user equipment also includes a transceiver, configured to: if the processor determines that the first preset condition is met, send the random access code by using an enhancement mode in the current random access attempt process.

According to the third aspect, in a first possible implementation manner of the third aspect, the first preset condition further includes: the random access code is sent by using a single transmission mode in the previous random access attempt process.

According to the third aspect or the first possible implementation manner of the third aspect, in a second possible implementation manner of the third aspect, the transceiver is specifically configured to: select a first enhancement level from enhancement levels of the enhancement mode, and send the random access code according to a pre-obtained random access parameter corresponding to the first enhancement level, where the first enhancement level is an enhancement level corresponding to least signal retransmission times in the enhancement levels; or select, from enhancement levels of the enhancement mode, a next enhancement level of an enhancement level used in the previous random access attempt process, and send the random access code according to a pre-obtained random access parameter corresponding to the next enhancement level, where signal retransmission times corresponding to the next enhancement level are more than signal retransmission times corresponding to the enhancement level used in the previous random access attempt process.

According to the third aspect and either of the first and the second possible implementation manners of the third aspect, in a third possible implementation manner of the third aspect, the transceiver is further configured to: after the random access code is sent by using the enhancement mode in the current random access attempt process, use a random access response parameter pre-configured by the network device to attempt to receive a random access response message sent by the network device; and if the random access response message is not received, determine that the current random access procedure fails; or if the random access response message is successfully received, send a scheduled transmission message to the network device by using a resource that is occupied by the scheduled transmission message and that is pre-configured by the network device; use a resource that is occupied by a contention resolution message and that is pre-configured by the network device to attempt to receive the contention resolution message indicating a random access success; and if the contention resolution message is not received, determine that the current random access procedure fails.

According to any one of the third aspect, or the first to the third possible implementation manners of the third aspect, in a fourth possible implementation manner of the third aspect, the processor is further configured to: when a random access procedure is initiated for the first time, determine a signal transmission mode for sending the random access code, where the signal transmission mode is the single transmission mode or the enhancement mode; obtain a random access parameter that corresponds to the determined signal transmission mode and that is pre-configured by the network device; and the transceiver is further configured to send the random access code to the network device by using the obtained random access parameter.

According to the second possible implementation manner of the third aspect, in a fifth possible implementation manner of the third aspect, the random access parameter includes random access channel resource information; and the processor is further configured to: after the first enhancement level is selected from the enhancement levels of the enhancement mode and before the random access code is sent according to the pre-obtained random access parameter corresponding to the first enhancement level, or after the next enhancement level of the enhancement level used in the previous random access attempt process is selected from the enhancement levels of the enhancement mode and before the random access code is sent according to the pre-obtained random access parameter corresponding to the next enhancement level, if the pre-obtained random access channel resource corresponding to the first enhancement level or the next enhancement level is available at a current moment, and the current moment is not a start moment of the random access channel resource corresponding to the first enhancement level or the next enhancement level, determine whether a preset policy is met; and if the preset policy is met, execute, at the current moment, the step of the sending the random access code according to a pre-obtained random access parameter corresponding to the first enhancement level or the next enhancement level.

According to the fifth possible implementation manner of the third aspect, in a sixth possible implementation manner of the third aspect, the preset policy includes: an interval between the current moment and the start moment of the random access channel resource corresponding to the first enhancement level or the next enhancement level is less than or equal to a first preset interval, where the first preset interval is fixed in a protocol or configured by the network device; or an interval between the current moment and an end moment of the random access channel resource corresponding to the first enhancement level or the next enhancement level is greater than or equal to a second preset interval, where the second preset interval is fixed in the protocol or configured by the network device.

According to the random access method, the random access apparatus, and the user equipment that are provided in the embodiments of the present invention, it is determined whether a first preset condition is met, where the first preset condition includes: a difference between a maximum transmit power allowed by the user equipment and a power of sending the random access code in a previous random access attempt process is less than or equal to a power ramping factor, and/or, the previous random access attempt process fails; and if the first preset condition is met, the random access code is sent by using an enhancement mode in the current random access attempt process. Therefore, a success rate of receiving, by a network device, the random access code sent by the user equipment is increased, and signal transmission reliability is improved.

DETAILED DESCRIPTION OF ILLUSTRATIVE EMBODIMENTS

Technical solutions provided in embodiments of the present invention may be applied to various wireless communications networks, such as a Global System for Mobile Communications (GSM), a Code Division Multiple Access (CDMA) system, a Wideband Code Division Multiple Access (WCDMA) system, a Universal Mobile Telecommunications System (UMTS), a general packet radio service (GPRS) system, a Long Term Evolution (LTE) system, a Long Term Evolution Advanced (LTE-A) system, and a Worldwide Interoperability for Microwave Access (WiMAX) system. The terms "network" and "system" can be interchanged.

In the embodiments, a network device, such as a base station (BS), may be a device in communication with user equipment (UE) or another communications station such as a relay station. The base station may provide radio coverage in a specific physical area. For example, the base station may be specifically a base transceiver station (BTS) or a base station controller (BSC) in GSM or CDMA; or may be a node B (NB) in UMTS or a radio network controller (Radio Network Controller, RNC for short) in UMTS; or may be a home eNodeB; or may be an evolved NodeB (eNB or eNodeB) in LTE; or may be another access network device providing an access service in a wireless communications network, which is not limited in the present invention. In the embodiments of the present invention, the user equipment may be distributed in an entire wireless network, and each UE may be stationary or in motion.

Figure 1:
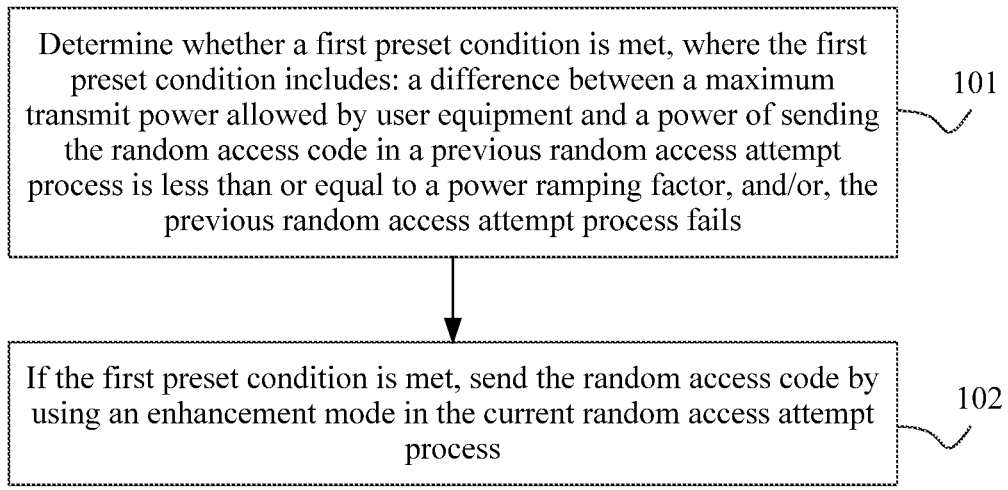
FIG. 1 is a flowchart of a random access method according to an embodiment.

FIG. 1 is a flowchart of a random access method according to an embodiment. As shown in FIG. 1, the method includes the following steps.

101. Determine whether a first preset condition is met, where the first preset condition includes: a difference between a maximum transmit power allowed by user equipment and a power of sending the random access code in a previous random access attempt process is less than or equal to a power ramping factor, and/or, the previous random access attempt process fails.

102. If the first preset condition is met, send the random access code by using an enhancement mode in the current random access attempt process.

Specifically, the method may be executed by user equipment, where the user equipment may be a communications terminal supporting an enhancement mode. The enhancement mode refers to a signal transmission mode in which a same signal or same content is retransmitted for multiple times.

The first preset condition is at least one of the following.

Condition 1: The difference between the maximum transmit power allowed by the user equipment and the power of sending the random access code in the previous random access attempt process is less than or equal to the power ramping factor.

Condition 2: The previous random access attempt process fails.

Condition 3: The difference between the maximum transmit power allowed by the user equipment and the power of sending the random access code in the previous random access attempt process is less than or equal to the power ramping factor; and the previous random access attempt process fails.

According to the random access method provided in this embodiment, user equipment determines, according to a power of sending a random access code to a network device in a previous random access attempt process and/or whether the previous random access attempt process fails, a signal transmission mode for sending the random access code in a current random access attempt process; and if a first preset condition is met, the random access code is sent by using an enhancement mode in the current random access attempt process, and the random access code is retransmitted for multiple times, so that real-time switching of signal transmission modes is implemented, a success rate of receiving the random access code by a network device is increased, and signal transmission reliability is improved.

Optionally, the first preset condition further includes: the random access code is sent by using a single transmission mode in the previous random access attempt process. The single transmission mode refers to a signal transmission manner in which a same signal or same content is transmitted only once.

Optionally, the random access code is sent by using the enhancement mode in the current random access attempt process in a manner of: selecting a first enhancement level from enhancement levels of the enhancement mode, and sending the random access code according to a pre-obtained random access parameter corresponding to the first enhancement level, where the first enhancement level is an enhancement level corresponding to least signal retransmission times in the enhancement levels; or selecting, from enhancement levels of the enhancement mode, a next enhancement level of an enhancement level used in the previous random access attempt process, and sending the random access code according to a pre-obtained random access parameter corresponding to the next enhancement level, where signal retransmission times corresponding to the next enhancement level are more than signal retransmission times corresponding to the enhancement level used in the previous random access attempt process.

Specifically, the user equipment may pre-obtain random access parameters corresponding to the single transmission mode and to the enhancement levels of the enhancement mode, and the acquisition method may be pre-sending, by the network device, the foregoing random access parameters to the user equipment by using a system broadcast message or a dedicated RRC message, or fixing the foregoing random access parameters in a protocol. Further, the system broadcast message or the dedicated RRC message that carries the foregoing random access parameters may be one message, or may be multiple messages. The random access parameters may include: a maximum quantity of random access attempts, a random access response (RAR) receive window size parameter, contention resolution timer duration, a power ramp step, a supported coverage enhancement level, an available random access channel resource, an available random access code resource, a maximum retransmission quantity of a message 3 (that is, a scheduled transmission message), a desired random access code receive power by the network device, and the like. For the random access response receive window size parameter and a contention resolution timer duration parameter, and for the single transmission mode and the enhancement levels of the enhancement mode, the network device may configure a same random access response receive window size parameter, or may configure different random access response receive window size parameters. The contention resolution timer duration is similar and not described any further. The power ramp step includes a power ramp step of the single transmission mode and/or power ramp steps of the enhancement levels. The power ramp steps of the single transmission mode and the enhancement mode may be the same, or may be different; power ramp steps of different enhancement levels may be the same, or may be different. The available random access channel resource includes a random access channel resource of the single transmission mode and/or random access channel resources of the enhancement levels. The available random access code resource includes a random access code resource of the single transmission mode and/or random access code resources of the enhancement levels. The desired random access code receive power by the network device may include: a desired random access code receive power by the network device in the single transmission mode and/or desired random access code receive powers by the network device at the enhancement levels.

Optionally, when the user equipment needs to initiate random access, the user equipment first determines a signal transmission mode in which the random access code is sent for the first time, obtains a random access parameter that corresponds to the determined signal transmission mode and that is pre-configured by the network device, and sends the random access code to the network device by using the obtained random access parameter. In comparison with the prior art in which a signal transmission mode is fixedly designated to the user equipment, according to the random access method provided in this embodiment of the present invention, the user equipment may implement flexible selection of a signal transmission mode, so as to ensure that the network device can successfully receive the random access code, and improve signal transmission reliability.

An implementation manner in which the user equipment determines the signal transmission mode in which the random access mode is sent for the first time may be any one of the following.

Manner 1: The network device indicates the signal transmission mode in which the user equipment sends the random access code, which includes whether the enhancement mode and the corresponding enhancement level are used.

Manner 2: The user equipment determines the signal transmission mode according to received signal strength, a path loss, or signal quality. Specifically, the user equipment compares the received signal strength, the path loss, or the signal quality with a configured threshold corresponding to the received signal strength, the path loss, or the signal quality, so as to determine the signal transmission mode used by the user equipment, which includes whether the enhancement mode and the corresponding enhancement level are used. It is assumed that the enhancement mode includes two enhancement levels: an enhancement level 1 and an enhancement level 2, and signal lightweight is used as an example.

If signal strength≤threshold 1, the user equipment selects the single transmission mode;

if threshold 1>signal strength≤threshold 2, the user equipment selects the enhancement level 1; or if threshold 2>signal strength≤threshold 3, the user equipment selects the enhancement level 2.

The threshold of the received signal strength, the path loss, or the signal quality may be configured by the network device, or may be stipulated in a protocol, which is not limited in the present invention.

Manner 3: The user equipment determines a to-be-used coverage enhancement level according to whether to receive a system broadcast message by using the enhancement mode or according to an enhancement level used when a system broadcast message is received.

Optionally, after determining the signal transmission mode in which the random access code is sent for the first time, the user equipment further needs to determine a transmit power of sending the random access code. An implementation method for determining the transmit power of sending the random access code is as follows:

If the user equipment selects the single transmission mode, the user equipment determines, according to the path loss (or the received signal strength or quality) and the desired receive power of the random access code by the network device, the transmit power of sending the random access code, and when the transmit power reaches the maximum transmit power allowed by the user equipment, the user equipment uses the allowed maximum transmit power.

If the user equipment selects the enhancement mode, the user equipment directly uses the allowed maximum transmit power; or the user equipment determines, according to the path loss (or the received signal strength or quality) and the desired receive power of the random access code by the network device, the transmit power of sending the random access code, and when the transmit power reaches the maximum transmit power allowed by the user equipment, the user equipment uses the allowed maximum transmit power.

Optionally, after sending the random access code to the network device by using the obtained random access parameter, the user equipment tries to receive a random access response message sent by the network device.

If the user equipment does not receive a required random access response message, it is considered that this random access procedure fails.

After the user equipment successfully receives the required random access response message, if the random access message is not in contention, it is considered that the random access procedure succeeds. If the random access message is in contention, the user equipment sends a scheduled transmission message to the network device by using a resource that is occupied by the scheduled transmission message and that is pre-configured by the network device, and enables a contention resolution timer. The user equipment uses a resource that is occupied by a contention resolution message and that is pre-configured by the network device to attempt to receive the contention resolution message that is used to indicate a success in the random access and that is sent by the network device. Before the contention resolution timer ends, if the required contention resolution message is received, this random access procedure succeeds, and if the contention resolution message is not received, the current random access procedure fails. In comparison with a resource notification manner in the prior art in which the network device adds the resource occupied by the scheduled transmission message into the random access response message, the network device in this embodiment of the present invention pre-configures, for the user equipment, the resource occupied by the scheduled transmission message, which reduces overhead of the random access response message.

Optionally, an implementation method in which the user equipment receives the random access response message sent by the network device is as follows:

Before the user equipment tries to receive the random access response message, or before the user equipment initiates the random access, the network device configures a random access response parameter for the user equipment, where the random access response parameter includes: a mapping relationship between resource information occupied by the random access response message or a resource corresponding to resource information occupied by the random access response message and a random access resource (including a physical random access channel resource and/or a random access code), a modulation and coding scheme and a redundancy version that are used by the random access response message, or retransmission times of the random access response message.

Further, optionally, the mapping relationship further includes a modulation and coding scheme and/or a redundancy version, and/or the like that are/is used by a random access response message corresponding to the random access resource, which is not limited in the present invention.

Further, optionally, the mapping relationship further includes repetition times of the random access response message corresponding to the random access resource. Specifically, the repetition times of the random access response message and repetition times of the random access resource may be the same, or may be different, which is not limited in the present invention.

A specific configuration method may be included in a system broadcast message (for example, a system broadcast message block 1, a system broadcast message block 2, or another system broadcast message) for notification, or may be fixed in a protocol, which is not limited in the present invention.

The user equipment obtains, according to the mapping relationship pre-configured by the network device, the resource information occupied by the random access response message corresponding to the random access resource, and tries, in the obtained resource occupied by the random access response message corresponding to the random access resource, to receive the random access response message sent by the network device; or receives the random access response message by using the modulation and coding scheme and/or the redundancy version that are/is used by the random access response message corresponding to the random access resource; or continuously receives, according to the repetition times corresponding to the random access response message corresponding to the random access resource, the random access response message sent by the network device. In comparison with the prior art in which the network device instructs, by transmitting, on a PDCCH channel, scheduling signaling that carries the resource occupied by the random access response message, the user equipment to receive, on a PDSCH channel, a resource location of the random access response message, the network device in this embodiment of the present invention pre-configures, for the user equipment, the resource occupied by the random access response message, which reduces PDCCH signaling overhead, and decreases a random access delay.

Optionally, before the user equipment sends the scheduled transmission message, the network device configures, for the user equipment, a mapping relationship between a resource occupied by the scheduled transmission message and a random access resource (including a physical random access channel resource and/or a random access code). A specific configuration method may be included in a system broadcast message (for example, a system broadcast message block 1, a system broadcast message block 2, or another system broadcast message) for notification, or may be fixed in a protocol, which is not limited in the present invention.

Further, optionally, the resource occupied by the scheduled transmission message may specifically include a time domain resource and/or a frequency domain resource, and/or repetition times, and/or a modulation and coding scheme, and/or a redundancy version that are/is of the scheduled transmission message.

Optionally, before the user equipment tries to receive the required contention resolution message, or before the user equipment initiates the random access, the network device configures, for the user equipment, a mapping relationship between a resource occupied by the contention resolution message and a random access resource (including a physical random access channel resource and/or a random access code). A specific configuration method may be included in a system broadcast message (for example, a system broadcast message block 1, a system broadcast message block 2, or another system broadcast message) for notification, or may be fixed in a protocol, which is not limited in the present invention.

Alternatively, optionally, the user equipment indicates, in the random access response message, the resource occupied by contention resolution.

Alternatively, optionally, before the user equipment tries to receive the required contention resolution message, or before the user equipment initiates the random access, the network device configures, for the user equipment, a mapping relationship between a resource occupied by the contention resolution message and a resource occupied by a random access response.

Alternatively, optionally, the network device configures, for the user equipment, a mapping relationship between a resource occupied by the contention resolution message and a resource occupied by the scheduled transmission message.

On the basis of the foregoing embodiment, if the user equipment determines that this random access procedure fails, and a maximum quantity of random access attempts is not reached yet, the user equipment resends the random access code.

In a scenario in which the user equipment resends the random access code, referring to the method embodiment shown in FIG. 1, the user equipment determines, according to the signal transmission mode for sending the random access code to the network device in a previous random access procedure, a signal transmission mode for sending the random access code in a current random access procedure.

Specifically, if the user equipment determines that the previous random access procedure fails, when the random access code is previously sent by using the single transmission mode, an attempt is first made to increase a power of sending the random access code by the user equipment by using the single transmission mode, and add one power ramp step to a previous transmit power. If the previous transmit power of the user equipment already reaches the maximum transmit power allowed by the user equipment, the user equipment enters the enhancement mode (that is, the user equipment sends the random access code by using the enhancement mode in the current random access procedure), and selects an enhancement level corresponding to least repetition times to send the random access code. Alternatively, if the transmit power of the user equipment that is obtained after one power ramping factor is added to the previous transmit power is greater than or equal to the maximum transmit power allowed by the user equipment, the user equipment uses the allowed maximum transmit power, or the user equipment enters the enhancement mode, and selects an enhancement level corresponding to least repetition times to send the random access code.

Further, optionally, after switched from the single transmission mode to the enhancement mode, the user equipment sends the random access code by using the maximum transmit power allowed by the user equipment; or determines, according to a desired receive power by the network device at a used enhancement level, a transmit power of the user equipment at the enhancement level used by the user equipment, and when the determined transmit power is greater than or equal to the maximum transmit power allowed by the user equipment, sends the random access code by using the maximum transmit power allowed by the user equipment.

Further, optionally, after the user equipment uses the enhancement mode and selects an enhancement level (for example, a first enhancement level), if the random access fails, the user equipment enters a next enhancement level (for example, a second enhancement level, where signal retransmission times corresponding to the second enhancement level are not less than signal retransmission times corresponding to the first enhancement level), and sends the random access code by using a random access parameter that corresponds to the second enhancement level and that is pre-configured by the network device. Alternatively, if the previous transmit power of the user equipment already reaches a maximum, the user equipment enters a next enhancement level, and sends the random access code. Alternatively, if the transmit power of the user equipment that is obtained after one power ramping factor is added to the previous transmit power is greater than or equal to the allowed maximum transmit power, the user equipment sends the random access code by using the maximum transmit power, or enters the next enhancement level and sends the random access code.

Further, optionally, after entering an enhancement level with maximum repetition times, the user equipment tries, by continuously using the enhancement level, to perform the random access procedure until the random access procedure succeeds, or the maximum quantity of random access attempts is reached.

On the basis of the foregoing embodiment, after a quantity of random access attempts in the enhancement mode reaches the maximum quantity of attempts, the user equipment triggers cell selection, re-selection, or re-establishment.

Specifically, after a Media Access Control (MAC) layer of the user equipment reaches the maximum quantity of random access attempts in the enhancement mode, the user equipment indicates, to an upper layer such as a Radio Resource Control (RRC) layer, that the random access procedure fails. After receiving the indication information, the RRC layer performs cell re-selection or re-establishment.

For cell selection and re-selection in the enhancement mode, the user equipment needs to repeatedly receive or combine system messages of a cell, which requires a relatively long period of time. If a cell does not support the enhancement mode, the user equipment may find, only after an extremely long period of time of repeated reception, that the cell does not support the enhancement mode, which increases a cell selection and re-selection delay and also increases power consumption of the user equipment.

Further, optionally, the network device indicates, to the user equipment, whether a neighboring cell or a neighboring frequency supports the enhancement mode and a supported enhancement level. In a specific indication method, the indication information may be indicated in a system broadcast message such as a master system information block (MIB), a system information block (SIB) n, where n is a positive integer, or in a dedicated RRC message. After receiving the indication information, the user equipment determines, according to the indication information, whether to perform cell selection or cell re-selection on the neighboring cell or the neighboring frequency. According to the technical solutions provided in this embodiment, a delay and power consumption problem that is caused because the user equipment tries to select or re-select a frequency or a cell that does not support the enhancement mode is alleviated.

On the basis of the foregoing embodiment, a method for determining RAR receive window sizes, contention resolution timer duration, and backoff time duration that are used at the enhancement levels of the enhancement mode is provided.

An implementation manner in which the user equipment determines, according to an RAR receive window size, contention resolution timer duration, and backoff time duration that correspond to the single transmission mode and that are configured by a network side (for example, the network device), the RAR receive window sizes, the contention resolution timer duration, and the backoff time duration that are used at the enhancement levels (an enhancement level y is used as an example) includes at least one of the following:

Implementation Manner 1.

RAR receive window size=RAR receive window size configured by the network side×repetition times corresponding to the enhancement level y; contention resolution timer duration=contention resolution timer duration configured by the network side×repetition times corresponding to the enhancement level y; and backoff time duration=backoff time duration configured by the network side×repetition times corresponding to the enhancement level y.

For example, if the RAR receive window size configured by the network side is 10, and a currently used enhancement level is y, where repetition times corresponding to the enhancement level are 20, the user equipment may accordingly determine that the receive window size at the current enhancement level is 10×20=200. Likewise, if the contention resolution timer duration configured by the network side is 100, the user equipment may also accordingly determine that the contention resolution timer duration at the current enhancement level is 100×20=2000.

Further, a possible start time of an RAR within an RAR receive window is: start time of the window+N×repetition times corresponding to the current enhancement level, where N is a natural number such as 0, 1, or 2, and N is less than the RAR receive window size parameter configured by the network side.

Further, the start time of the RAR receive window is an $M^{th}$ TTI starting from a transmission time interval (TTI) at which the random access code is completely sent, where M is a natural number, for example, M=3 or 4. An M value may be configured by the network side, or may be fixed in a protocol. Alternatively, start time of the RAR receive window=$M^{th}$ TTI starting from a TTI at which the random access code is completely sent×repetition times corresponding to the current enhancement level.

Implementation Manner 2.

RAR receive window size=repetition times of the enhancement level y; and contention resolution timer duration=repetition times corresponding to the enhancement level y.

Implementation Manner 3:

A same larger RAR receive window size and same longer contention resolution timer duration are configured for the different enhancement levels; or a larger RAR receive window size and longer contention resolution timer duration are configured for each of the different enhancement levels.

Implementation Manner 4.

RAR receive window size=RAR receive window size configured by the network side×(2×repetition times corresponding to the enhancement level y+K); contention resolution timer duration=contention resolution timer duration configured by the network side×(2×repetition times corresponding to the enhancement level y+K). K is an interval between an end moment of the PDCCH for scheduling the RAR message and a start moment of the RAR message, and is a natural number, and a value of K is configured by the network side or fixed in a protocol. For example, if the end moment of the PDCCH is X, the start moment of the RAR is X+K.

Implementation Manner 5.

RAR receive window size=RAR receive window size configured by the network side×(repetition times that are of the PDCCH for scheduling the RAR message and that correspond to the enhancement level y+repetitions time that are of the RAR message and that correspond to the enhancement level y+K); contention resolution timer duration=contention resolution timer duration configured by the network side×(repetition times that are of the PDCCH for scheduling the contention resolution message and that correspond to the enhancement level y+repetition times that are of the contention resolution message and that correspond to the enhancement level y+K). K is an interval between an end moment of the PDCCH for scheduling the RAR message and a start moment of the RAR message, and is a natural number, and a value of K is configured by the network side or fixed in a protocol. For example, if the end moment of the PDCCH is X, the start moment of the RAR is X+K.

On the basis of the foregoing embodiment, a method for sending the random access code by the user equipment is provided.

After the user equipment determines to send the random access code by using the enhancement mode, and determines the used enhancement level (for example, the first enhancement level or the next enhancement level of the enhancement level used in the previous random access attempt process), if there is no random access channel resource corresponding to the enhancement level at a current moment, the user equipment sends, at a next available moment of the random access channel resource corresponding to the enhancement level, the random access code corresponding to the enhancement level.

After the user equipment determines to send the random access code by using the enhancement mode, and determines the used enhancement level, if the pre-obtained random access channel resource corresponding to the first enhancement level is available at a current moment (or a moment at which the user equipment can start to send the random access code), but the current moment is not a start moment of the random access channel resource corresponding to the first enhancement level, the user equipment determines whether a preset policy is met, that is, determines whether to start, at the current moment (or the moment at which the user equipment can start to send the random access code) and by using the random access channel resource, to send the random access code corresponding to the enhancement level. The preset policy includes: an interval between the current moment and a start moment of the random access channel resource corresponding to the first enhancement level or the next enhancement level is less than or equal to a first preset interval, where the first preset interval is fixed in a protocol or configured by the network device; or an interval between the current moment and an end moment of the random access channel resource corresponding to the first enhancement level or the next enhancement level is greater than or equal to a second preset interval, where the second preset interval is fixed in the protocol or configured by the network device.

Optionally, a method for determining whether the preset policy is met includes at least one of the following.

Policy 1: The network side configures a threshold X. When the user equipment starts to send the random access code at the current moment and by using the determined enhancement level, and times for which repetition can be performed are greater than or equal to the threshold X, the user equipment determines to start, at the current moment, to send the random access code corresponding to the enhancement level, and otherwise, the user equipment determines not to start, at the current moment, to send the random access code corresponding to the enhancement level. Optionally, the threshold X may be configured by the network side according to each of the different enhancement levels.

Policy 2: When the user equipment starts to send the random access code at the current moment and by using the determined enhancement level, and times for which repetition can be performed are greater than or equal to repetition times corresponding to a previous enhancement level, the user equipment determines to start, at the current moment, to send the random access code corresponding to the enhancement level, and otherwise, the user equipment determines not to start, at the current moment, to send the random access code corresponding to the enhancement level.

Policy 3: The network side configures a threshold Y. When the user equipment starts to send the random access code at the current moment and by using the determined enhancement level, and times for which repetition can be performed are greater than or equal to a sum of Y and repetition times corresponding to a previous enhancement level, the user equipment determines to start, at the current moment, to send the random access code corresponding to the enhancement level, and otherwise, the user equipment determines not to start, at the current moment, to send the random access code corresponding to the enhancement level.

Obviously, the method for sending the random access code by the user equipment that is provided in this embodiment is also applicable to a scenario in which the previous enhancement level of the currently used enhancement level is a single transmission mode.

According to the method for sending the random access code by the user equipment that is provided in this embodiment of the present invention, the random access code can be sent as early as possible, and waiting for a next start moment of a resource is not required, which decreases a random access delay.

Because same data needs to be retransmitted for multiple times in the enhancement mode and different enhancement levels correspond to different repetition times, in a process of data retransmission, some subframes probably cannot be used for some reason. A possible scenario in which a subframe cannot be used is as follows, for example:

Scenario 1: The subframe is within a measurement interval.

Scenario 2: When a dynamic configuration changes, the subframe changes in direction, for example, from uplink to downlink, or from downlink to uplink.

Scenario 3: The subframe is a subframe conflicting with transmission of other data (with a higher priority) such as an MIB, or paging, or an SIB, or a multimedia broadcast multicast service (MBMS).

Scenario 4: The subframe is a subframe that cannot be used for data transmission for another reason, for example, an almost blank subframe (ABS) introduced due to inter-cell interference coordination.

The random access procedure is used as an example, and a similar problem occurs during retransmission of a random access code, a random access response, a message 3 (a scheduled transmission message), and a contention resolution message that are in the enhancement mode. Likewise, a similar problem also occurs during other data transmission, for example, transmission on a physical channel such as a physical uplink shared channel (PUSCH), a PDSCH, or a PDCCH.

In the foregoing scenarios, if the user equipment and the network device understand differently about a repeated location of data transmission, a transmit end wastes a transmit power, interference is caused, a receive end fails to receive and combine data, and performance is affected. Therefore, the user equipment needs to determine the repeated location of the data transmission. For the foregoing scenario, a method for determining repeated locations corresponding to different enhancement levels that is provided in this embodiment includes at least one of the following.

A determining method 1: The network side configures, for the user equipment, information about a subframe location at which data may be retransmitted. That is, the user equipment may retransmit the data at these subframe locations. For example, the information about a subframe location at which the data may be retransmitted and that is configured by the network side for the user equipment is subframes 1, 2, 3, 4, 6, 7, 8, and 9 of each radio frame. When the user equipment needs to perform 20 retransmissions starting from a subframe 1 of a radio frame 0, a subframe location at which the user equipment actually performs retransmission is subframes 1, 2, 3, 4, 6, 7, 8, and 9 of the radio frame 0, subframes 1, 2, 3, 4, 6, 7, 8, and 9 of a radio frame 1, and subframes 1, 2, 3, and 4 of a radio frame 2, which amounts to 20 retransmissions. If uplink data is being sent, the user equipment repeatedly sends the uplink data at these subframe locations, and likewise, a base station repeatedly receives the uplink data at these subframe locations. For downlink data, a reverse operation is performed, and details are not described herein. In Option 1, the user equipment counts only a subframe in which transmission is actually performed.

A determining method 2. The network side configures, for the user equipment, information about a subframe location at which data cannot be retransmitted. That is, the user equipment cannot retransmit the data at these subframe locations. Option 2 and Option 1 give description from positive and negative perspectives. Details are not described herein. A specific configuration method may be measured interval configuration, and/or MBSFN subframe configuration, and/or limited collective parameter measurement, and/or another similar configuration method, which is not limited in the present invention.

A determining method 3 is similar to the foregoing determining method 1, but a difference lies in that the user equipment counts all subframes during retransmission regardless of whether data transmission is actually performed in the subframe. In view of this, an exemplary result in the foregoing determining method 1 is changed into as follows: For example, the information about a subframe location at which the data may be retransmitted and that is configured by the network side for the user equipment is subframes 1, 2, 3, 4, 6, 7, 8, and 9 of each radio frame. When the user equipment needs to perform 20 retransmissions starting from a subframe 1 of a radio frame 0, a subframe location at which the user equipment actually performs retransmission is subframes 1, 2, 3, 4, 6, 7, 8, and 9 of the radio frame 0, and subframes 1, 2, 3, 4, 6, 7, 8, and 9 of a radio frame 1, which amounts to 16 transmissions. In a subframe 5 of the radio frame 0, subframes 0 and 5 of the radio frame 1, and a subframe 0 of the radio frame 2, actual data transmission is not performed, and repetition times are not counted either. If uplink data is being sent, the user equipment repeatedly sends the uplink data at these subframe locations, and likewise, a base station repeatedly receives the uplink data at these subframe locations. For downlink data, a reverse operation is performed, and details are not described herein.

A determining method 4 is similar to the foregoing determining method 2, but a difference lies in that the user equipment counts all subframes during retransmission regardless of whether data transmission is actually performed in the subframe.

Further, optionally, uplink data transmission and downlink data transmission may be separately configured.

Further, optionally, a configuration method may be configuration by using a system broadcast message, a dedicated RRC message, a MAC layer message, or a physical layer (PHY) message, or may be fixed in a protocol, which is not limited in the present invention.

This embodiment provides two methods for implementing cell selection or re-selection in the enhancement mode.

Method a.

The network device configures one or a set of thresholds, so that the user equipment performs cell selection or re-selection by using the enhancement mode. When performing cell selection by using the enhancement mode, the user equipment determines, according to a threshold configured by the network side for cell selection in the enhancement mode and a measurement result of the user equipment, whether a cell selection condition is met. A specific cell selection threshold may be a received signal strength threshold and/or a received signal quality threshold.

Further, optionally, for different enhancement levels in the enhancement mode, a same cell selection threshold may be configured, or different cell selection thresholds may be configured.

A cell selection threshold for the enhancement mode is configured, so that the user equipment can implement cell selection or re-selection in the enhancement mode.

Method b.

The network device configures one or a set of measurement result combination times, so that the user equipment performs cell selection by using the enhancement mode. When performing cell selection by using the enhancement mode, the user equipment combines measurement results according to the one or the set of measurement result combination times that is configured by the network side for cell selection in the enhancement mode, and determines, according to a combined measurement result and a cell selection threshold configured by the network side, whether a cell selection condition is met. A specific cell selection threshold may be a received signal strength threshold and/or a received signal quality threshold.

Optionally, the cell selection threshold may be a threshold for the user equipment to perform cell re-selection by using the single transmission mode, or may be a threshold for the user equipment to perform cell re-selection by using the enhancement mode, which is not limited in the present invention. For example, if measurement result combination times configured for cell selection in the enhancement mode are 20, the user equipment eventually outputs a combined result after combining the 20 measurement results. A specific combination method may be simple linear addition, or weighted addition, or another manner, which is not limited in the present invention. The user equipment determines, according to the combined result and the threshold configured by the network side, whether a cell selection condition is met. For another example, measurement result combined times configured for cell selection at an enhancement level 1 in the enhancement mode are 10, and measurement result combined times of cell selection at an enhancement level 2 are 20, Therefore, the user equipment combines the 10 measurement results at the enhancement level 1 and eventually outputs a combined result, and the user equipment determines, according to the combined result and the threshold configured by the network side, whether a cell selection condition at the coverage enhancement level 1 is met. The user equipment combines the 20 measurement results at the enhancement level 2 and eventually outputs a combined result, and the user equipment determines, according to the combined result and the threshold configured by the network side, whether a cell selection condition at the coverage enhancement level 2 is met.

Further, optionally, when performing cell selection or re-selection, the user equipment needs to read a system broadcast message of a cell, for example, an MIB, an SIB1, or an SIB2. In the enhancement mode, the user equipment needs to repeatedly receive the MIB, the SIB1, the SIB2, or the like, and the system broadcast message such as the SIB1 or the SIB2 is transmitted in a scheduled manner. However, in the enhancement mode, the user equipment probably cannot correctly receive scheduling commands of these system broadcast messages, and therefore, cannot correctly obtain these system broadcast messages. Therefore, cell selection or re-selection cannot be completed. A feasible solution is configuring location information of the system broadcast message such as the SIB1 or the SIB2, where a specific location may include at least one frequency domain location such as a physical resource block(PRB) and/or at least one time domain location (a subframe). A specific configuration method may be that the location information is fixed in a protocol or notified in the MIB. Alternatively, location information of another SIB such as the SIB2 is notified in the SIB1. The SIB1 is used as an example. A configured frequency domain location of the SIB1 may be f1, f2, or f3. When receiving the SIB1, the user equipment may repeatedly receive multiple SIB1s at the frequency domain location f1 and performs combination, so as to eventually obtain the SIB1. Alternatively, the user equipment may attempt to repeatedly receive the multiple SIB1s at the frequency domain location f2 and perform combination, so as to eventually obtain the SIB1. Alternatively, the user equipment may attempt to repeatedly receive the multiple SIB1s at the frequency domain location f3 and perform combination, so as to eventually obtain the SIB1. The SIB1 may be retransmitted at least one of the locations f1, f2, or f3. Another feasible solution is that a configured frequency domain location of the SIB1 is f1, f2, or f3. When receiving the SIB1, the user equipment repeatedly receives multiple SIB1s at f1, f2, and f3 at the same time and performs combination, so as to obtain the SIB1. The SIB1 is repeatedly transmitted at the locations f1, f2, and f3.

The user equipment receives the system broadcast message at the at least one frequency domain and/or the at least one time domain location according to the location information. A method for sending and receiving another SIB or system information (SI) including multiple SIBs is similar to the method for sending and receiving the SIB1, and details are not described herein.

Further, optionally, information such as a scheduling and coding scheme and a redundancy version that are of the system broadcast message such as the SIB1 or the SIB2 may be further configured.

Further, optionally, a location of a system broadcast message of another SIB such as an SIB2 or an SIB3 may be notified in the SIB1, and a notification method is similar to a notification method performed in the MIB. Details are not described herein.

Figure 2:
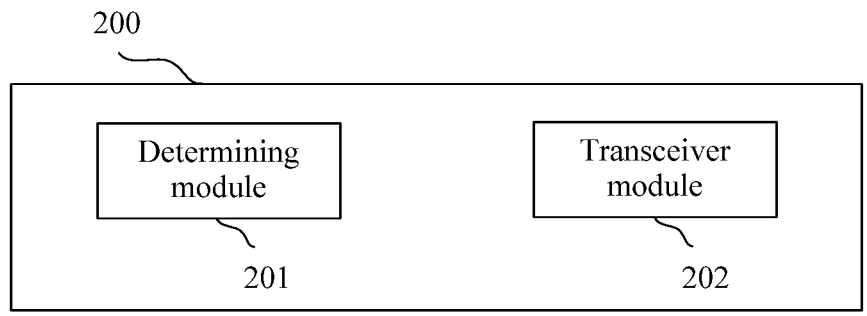
FIG. 2 is a schematic structural diagram of a random access apparatus according to an embodiment.

FIG. 2 is a schematic structural diagram of a random access apparatus according to an embodiment. As shown in FIG. 2, the random access apparatus 200 includes: a determining module 201, configured to determine whether a first preset condition is met, where the first preset condition includes: a difference between a maximum transmit power allowed by user equipment and a power of sending the random access code in a previous random access attempt process is less than or equal to a power ramping factor, and/or, the previous random access attempt process fails; and a transceiver module 202, configured to: if the determining module 201 determines that the first preset condition is met, send the random access code by using an enhancement mode in the current random access attempt process.

The random access apparatus 200 provided in this embodiment may be used to execute the technical solutions in the method embodiment shown in FIG. 1, and implementation principles and technical effects of the apparatus 200 are similar to those of the method embodiment, and details are not described herein.

Optionally, the first preset condition further includes: the random access code is sent by using a single transmission mode in the previous random access attempt process.

On the basis of the foregoing embodiment, the transceiver module 202 is specifically configured to: select a first enhancement level from enhancement levels of the enhancement mode, and send the random access code according to a pre-obtained random access parameter corresponding to the first enhancement level, where the first enhancement level is an enhancement level corresponding to least signal retransmission times in the enhancement levels; or select, from enhancement levels of the enhancement mode, a next enhancement level of an enhancement level used in the previous random access attempt process, and send the random access code according to a pre-obtained random access parameter corresponding to the next enhancement level, where signal retransmission times corresponding to the next enhancement level are more than signal retransmission times corresponding to the enhancement level used in the previous random access attempt process.

Optionally, the transceiver module 202 is further configured to: after the random access code is sent by using the enhancement mode in the current random access attempt process, use a random access response parameter pre-configured by the network device to attempt to receive a random access response message sent by the network device; and if the random access response message is not received, determine that the current random access procedure fails; or if the random access response message is successfully received, send a scheduled transmission message to the network device by using a resource that is occupied by the scheduled transmission message and that is pre-configured by the network device; use a resource that is occupied by a contention resolution message and that is pre-configured by the network device to attempt to receive the contention resolution message indicating a random access success; and if the contention resolution message is not received, determine that the current random access procedure fails.

Optionally, the determining module 201 is further configured to: when a random access procedure is initiated for the first time, determine a signal transmission mode for sending the random access code, where the signal transmission mode is the single transmission mode or the enhancement mode; obtain a random access parameter that corresponds to the determined signal transmission mode and that is pre-configured by the network device; and the transceiver module 202 is further configured to send the random access code to the network device by using the obtained random access parameter.

Optionally, the random access parameter includes random access channel resource information; and the determining module 201 is further configured to: after the first enhancement level is selected from the enhancement levels of the enhancement mode and before the random access code is sent according to the pre-obtained random access parameter corresponding to the first enhancement level, or after the next enhancement level of the enhancement level used in the previous random access attempt process is selected from the enhancement levels of the enhancement mode and before the random access code is sent according to the pre-obtained random access parameter corresponding to the next enhancement level, if the pre-obtained random access channel resource corresponding to the first enhancement level or the next enhancement level is available at a current moment, and the current moment is not a start moment of the random access channel resource corresponding to the first enhancement level or the next enhancement level, determine whether a preset policy is met; and if the preset policy is met, execute, at the current moment, the step of the sending the random access code according to a pre-obtained random access parameter corresponding to the first enhancement level or the next enhancement level.

Optionally, the preset policy includes: an interval between the current moment and the start moment of the random access channel resource corresponding to the first enhancement level or the next enhancement level is less than or equal to a first preset interval, where the first preset interval is fixed in a protocol or configured by the network device; or an interval between the current moment and an end moment of the random access channel resource corresponding to the first enhancement level or the next enhancement level is greater than or equal to a second preset interval, where the second preset interval is fixed in the protocol or configured by the network device.

Figure 3:
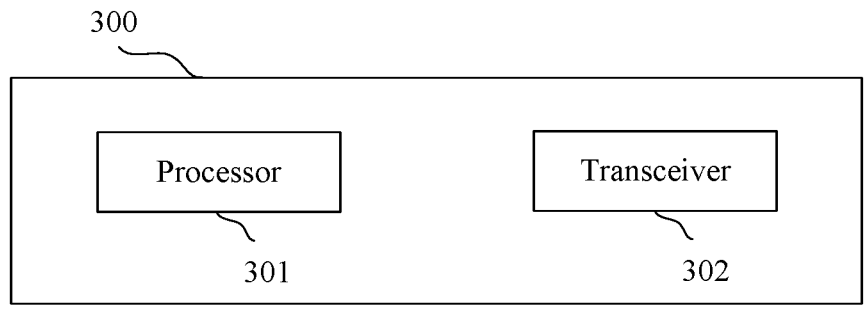
FIG. 3 is a schematic structural diagram of user equipment according to an embodiment.

FIG. 3 is a schematic structural diagram of user equipment according to an embodiment. As shown in FIG. 3, the user equipment 300 includes: a processor 301, configured to determine whether a first preset condition is met, where the first preset condition includes: a difference between a maximum transmit power allowed by the user equipment and a power of sending the random access code in a previous random access attempt process is less than or equal to a power ramping factor, and/or, the previous random access attempt process fails. The user equipment also includes a transceiver 302, configured to: if the processor 301 determines that the first preset condition is met, send the random access code by using an enhancement mode in the current random access attempt process.

The user equipment 300 provided in this embodiment may be used to execute the technical solutions in the method embodiment shown in FIG. 1, and implementation principles and technical effects of the user equipment 300 are similar to those of the method embodiment, and details are not described herein.

Optionally, the first preset condition further includes: the random access code is sent by using a single transmission mode in the previous random access attempt process.

Optionally, the transceiver 302 is specifically configured to: select a first enhancement level from enhancement levels of the enhancement mode, and send the random access code according to a pre-obtained random access parameter corresponding to the first enhancement level, where the first enhancement level is an enhancement level corresponding to least signal retransmission times in the enhancement levels; or select, from enhancement levels of the enhancement mode, a next enhancement level of an enhancement level used in the previous random access attempt process, and send the random access code according to a pre-obtained random access parameter corresponding to the next enhancement level, where signal retransmission times corresponding to the next enhancement level are more than signal retransmission times corresponding to the enhancement level used in the previous random access attempt process.

Optionally, the transceiver 302 is further configured to: after the random access code is sent by using the enhancement mode in the current random access attempt process, use a random access response parameter pre-configured by the network device to attempt to receive a random access response message sent by the network device; and if the random access response message is not received, determine that the current random access procedure fails; or if the random access response message is successfully received, send a scheduled transmission message to the network device by using a resource that is occupied by the scheduled transmission message and that is pre-configured by the network device; use a resource that is occupied by a contention resolution message and that is pre-configured by the network device to attempt to receive the contention resolution message indicating a random access success; and if the contention resolution message is not received, determine that the current random access procedure fails.

Optionally, the processor 301 is further configured to: when a random access procedure is initiated for the first time, determine a signal transmission mode for sending the random access code, where the signal transmission mode is the single transmission mode or the enhancement mode; obtain a random access parameter that corresponds to the determined signal transmission mode and that is pre-configured by the network device; and the transceiver 302 is further configured to send the random access code to the network device by using the obtained random access parameter.

Optionally, the random access parameter includes random access channel resource information; and the processor 301 is further configured to: after the first enhancement level is selected from the enhancement levels of the enhancement mode and before the random access code is sent according to the pre-obtained random access parameter corresponding to the first enhancement level, or after the next enhancement level of the enhancement level used in the previous random access attempt process is selected from the enhancement levels of the enhancement mode and before the random access code is sent according to the pre-obtained random access parameter corresponding to the next enhancement level, if the pre-obtained random access channel resource corresponding to the first enhancement level or the next enhancement level is available at a current moment, and the current moment is not a start moment of the random access channel resource corresponding to the first enhancement level or the next enhancement level, determine whether a preset policy is met; and if the preset policy is met, execute, at the current moment, the step of the sending the random access code according to a pre-obtained random access parameter corresponding to the first enhancement level or the next enhancement level.

Optionally, the preset policy includes: an interval between the current moment and the start moment of the random access channel resource corresponding to the first enhancement level or the next enhancement level is less than or equal to a first preset interval, where the first preset interval is fixed in a protocol or configured by the network device; or an interval between the current moment and an end moment of the random access channel resource corresponding to the first enhancement level or the next enhancement level is greater than or equal to a second preset interval, where the second preset interval is fixed in the protocol or configured by the network device.

Figure 4:
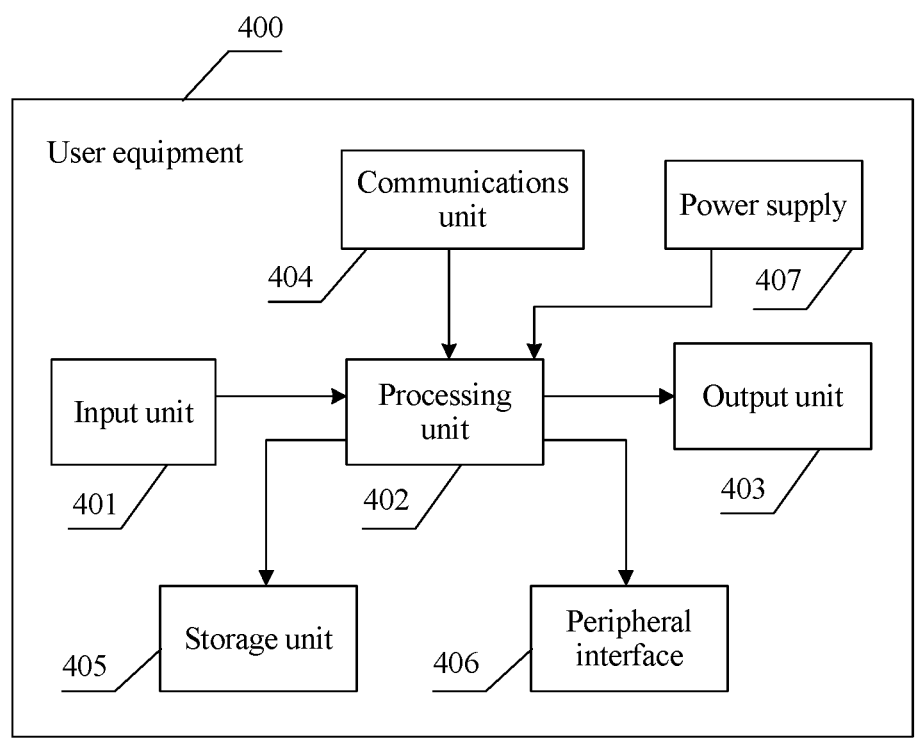
FIG. 4 is another schematic structural diagram of user equipment according to an embodiment.

FIG. 4 is another schematic structural diagram of user equipment according to an embodiment. As shown in FIG. 4, user equipment 400 provided in this embodiment of the present invention includes components such as an input unit 401, a processing unit 402, an output unit 403, a communications unit 404, a storage unit 405, a peripheral interface 406, and a power supply 407. These components perform communication by using one or more buses. Persons skilled in the art may understand that a structure of the user equipment 400 shown in FIG. 4 does not constitute a limitation on the present invention, and instead the user equipment may be a bus structure, or a star structure, and may further include parts fewer or more than those shown in FIG. 4, or a combination of some parts, or parts disposed differently. In an implementation manner of the present invention, the user equipment 400 may be any mobile or portable communication device, and includes but is not limited to a mobile phone, a mobile computer, a tablet computer, a personal digital assistant (PDA), a media player, a smart television, and a combination of the foregoing two or more items.

The input unit 401 is configured to implement interaction between a user and the user equipment 400 and/or information entering into the user equipment 400. For example, the input unit 401 may receive data or character information that is entered by the user, so as to generate signal input related to a user setting or function control. In a specific implementation manner of the present invention, the input unit 401 may be a touch panel, or may be another human-computer interaction interface such as a substantive input key or a microphone, or may be another external information capturing apparatus such as a camera. The touch panel is also referred to as a touchscreen and may collect an operation action of touching or approaching the touch panel by the user, for example, an operation action performed by the user on the touch panel or at a location close to the touch panel by using any proper object or accessory such as a finger or a stylus. A corresponding connected apparatus is driven according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller; the touch controller receives the electrical signal from the touch detection apparatus, converts the electrical signal into touch point coordinates, and then sends the touch point coordinates to the processing unit 402. The touch controller may further receive and execute a command sent by the processing unit 402. In addition, the touch panel may be implemented in multiple types, such as a resistive type, a capacitive type, an infrared ray, and a surface acoustic wave. In another implementation manner of the present invention, the substantive input key used by the input unit 401 may include but is not limited to one or more of a physical keyboard, a functional key (for example, a volume control key or a power on/off button), a trackball, a mouse, a joystick, or the like. An input unit in a microphone form may collect a voice entered by the user or in an environment, and convert the voice into a command that is in an electrical signal form and that may be executed by the processing unit 402.

In some other implementation manners of the present invention, the input unit 401 may be various types of sensing components, for example, a Hall device, and is configured to detect a physical quantity of the user equipment 400, for example, a force, torque, pressure, stress, a location, displacement, a speed, acceleration, an angle, an angular speed, a revolution, a revolving speed, or a time at which a working status changes, which is converted to power for detection and control. Some other sensing components may include a gravity sensor, a tri-axis accelerometer, a gyroscope, and the like.

The processing unit 402 is a control center of the user equipment 400, is connected to parts of the entire user equipment 400 by using various interfaces and circuits, and performs various functions of the user equipment 400 and/or processes data by running or executing a software program and/or a module that are/is stored in the storage unit 405 and by invoking data stored in the storage unit 405. The processing unit 402 may be constituted of an integrated circuit (IC), for example, may be constituted of a single packaged IC, or may be constituted of multiple packaged ICs with a same function or different functions. For example, the processing unit 402 may include only a central processing unit (CPU), or may be a combination of a GPU, a digital signal processor (DSP), and a control chip (for example, a baseband chip) in the communications unit 404. In this implementation manner of the present invention, the CPU may be a single operating core, or may include multiple operating cores.

The communications unit 404 is used for communication between the user equipment 400 and another device, and a data packet may be received or sent by using the communications unit 404. The communications unit 404 may include a communications module such as a wireless local area network (WLAN) module, a Bluetooth module, and a baseband module, and a radio frequency (RF) circuit corresponding to the communications module, which is used to perform wireless local area network communication, Bluetooth communication, infrared communication, and/or cellular communications system communication, for example, Wideband Code Division Multiple Access (W-CDMA) and/or High Speed Downlink Packet Access (HSDPA). The communications module is configured to control communication between components in the user equipment 400, and may support direct memory access.

In different implementation manners of the present invention, each communications module in the communications unit 404 generally appears in an integrated circuit chip form, may be selectively combined, and does not necessarily include all communications modules and corresponding antenna groups. For example, the communications unit 404 may include only a baseband chip, a radio frequency chip, and a corresponding antenna, so as to provide a communication function in a cellular communications system. The user equipment 400 may access a cellular network or Internet by using a wireless communications connection established by using the communications unit 404, for example, wireless local area network access or WCDMA access. In some optional implementation manners of the present invention, the communications module in the communications unit 404, for example, the baseband module, may be integrated into the processing unit 402, such as a typical APQ+MDM series platform provided by the Qualcomm corporation.

The output unit 403 includes but is not limited to an image output unit and an audio output unit. The image output unit is configured to output a character, a picture, and/or a video. The image output unit may include a display panel, for example, a display panel configured in a form of an LCD (Liquid Crystal Display), an OLED (Organic Light-Emitting Diode), a field emission display (FED), or the like. Alternatively, the image output unit may include a reflective display, for example, an electrophoretic display or a display using an interferometric modulation of light technology. The image output unit may include a single display or multiple displays of different sizes. In a specific implementation manner of the present invention, a touch panel used by the foregoing input unit 401 may also be used as a display panel of the output unit 403. For example, after detecting a gesture operation of touching or approaching the touch panel, the touch panel transfers the gesture operation to the processing unit 402, so as to determine a touch event type. Then, the processing unit 402 provides corresponding visual output on the display panel according to the touch event type. In FIG. 4, although the input unit 401 and the output unit 403 are used as two separate parts to implement input and output functions of the user equipment 400, in some embodiments, the touch panel and the display panel may be integrated to implement the input and output functions of the user equipment 400. For example, the image output unit may display various graphical user interfaces (GUI), so that the graphical user interfaces are used as virtual control components and include but are not limited to a window, a scrollbar, an icon, and a scrapbook. In this way, a user performs an operation in a touch manner.

In a specific implementation manner of the embodiments, the image output unit includes a filter and an amplifier that are configured to filter and amplify a video that is output by the processing unit 402. The audio output unit includes a digital-to-analog converter that is configured to convert, from a digital format to an analog format, an audio signal that is output by the processing unit 402.

The storage unit 405 may be configured to store a software program and a module, and the processing unit 402 executes various functional applications of the user equipment 400 and implements data processing by running the software program and the module that are stored in the storage unit 405. The storage unit 405 mainly includes a program storage area and a data storage area. The program storage area may store an operating system and an application program required by at least one function, such as a sound playing program and an image playing program. The data storage area may store data (for example, audio data and a phone book) that is created according to use of the user equipment 400, and the like. In a specific implementation manner of the present invention, the storage unit 405 may include a volatile memory, for example, a nonvolatile random access memory (NVRAM), a phase change random access memory (PRAMt), and a magnetoresistive random access memory (MRAM), or may further include a non-volatile memory, for example, at least one magnetic disk storage device, an electrically erasable programmable read-only memory (EEPROM), and a flash memory such as a NOR flash memory or a NAND flash memory. The non-volatile memory stores an operating system and an application program that are executed by the processing unit 402. The processing unit 402 loads, from the non-volatile memory, a running program and data to a memory, and stores digital content in an apparatus with large storage. The operating system includes various components and/or drivers that are configured to control and manage regular system tasks such as memory management, storage device control, and power management and that are conducive to communication between software and hardware. In this implementation manner of the present invention, the operating system may be an Android system of the Google corporation, an iOS system developed by the Apple corporation, a Windows operating system developed by the Microsoft corporation, or the like, or is an embedded operating system such as Vxworks.

The application program includes any application installed on the user equipment 400, and includes but is not limited to a browser, an E-mail, an instant messaging service, text processing, keyboard virtualization, a window widget, encryption, digital rights management, voice recognition, voice duplication, positioning (for example, a function provided by the Global Positioning System), music play, and the like.

Specifically, in this embodiment, the storage unit 405 stores program data, and the processing unit 402 executes the program data, so as to determine whether a first preset condition is met, where the first preset condition includes: a difference between a maximum transmit power allowed by the user equipment and a power of sending the random access code in a previous random access attempt process is less than or equal to a power ramping factor, and/or, the previous random access attempt process fails; and if the first preset condition is met, send the random access code by using an enhancement mode in the current random access attempt process.

The communications unit 404 may pre-obtain random access parameters corresponding to enhancement levels of the enhancement mode, and the storage unit 405 may store the random access parameters that correspond to the enhancement levels of the enhancement mode and that are pre-obtained by the communications unit 404.

The communications unit 404 selects a first enhancement level from enhancement levels of the enhancement mode, and sends the random access code according to a pre-obtained random access parameter corresponding to the first enhancement level, where the first enhancement level is an enhancement level corresponding to least signal retransmission times in the enhancement levels; or selects, from enhancement levels of the enhancement mode, a next enhancement level of an enhancement level used in the previous random access attempt process, and sends the random access code according to a pre-obtained random access parameter corresponding to the next enhancement level, where signal retransmission times corresponding to the next enhancement level are more than signal retransmission times corresponding to the enhancement level used in the previous random access attempt process.

The power supply 407 is configured to supply power for different parts of the user equipment 400, so as to maintain running of the different parts. It is generally understood that the power supply may be a built-in battery, for example, a common lithium-ion battery or a nickel-hydride battery, or includes an external power supply that directly supplies power for the user equipment 400, for example, an AC adapter. In some implementation manners of the present invention, the power supply 407 may be further defined in a wider scope, for example, may further include a power management system, a charging system, a power fault detection circuit, a power converter or inverter, a power status indicator (for example, a light emitting diode), and any other components related to electricity generation, management, and distribution of the user equipment 400.

In addition, an LTE-A system includes two duplex modes: frequency division duplex (FDD) and time division duplex (TDD). There are seven different TDD uplink-downlink configurations in the TDD mode, quantities of uplink subframes and downlink subframes that are included in each configuration are different, which are separately applicable to different uplink-downlink data volume services. For example, in a TDD uplink-downlink configuration 0, subframes 2, 3, 4, 7, 8, and 9 are uplink subframes, subframes 0 and 5 are downlink subframes, and subframes 1 and 6 are special subframes. In a TDD uplink-downlink configuration 1, subframes 2, 3, 7, and 8 are uplink subframes, subframes 0, 4, 5, and 9 are downlink subframes, and subframes 1 and 6 are special subframes. In a TDD uplink-downlink configuration 2, subframes 2 and 7 are uplink subframes, subframes 0, 3, 4, 5, 8, and 9 are downlink subframes, and subframes 1 and 6 are special subframes. In addition, to better adapt to a dynamic change of a service volume, a TDD uplink-downlink flexible configuration feature is introduced. In the feature, a base station may notify UE of an up-to-date TDD uplink-downlink configuration by using a re-configuration command that is transmitted on a physical downlink control channel (PDCCH). The UE uses, according to the up-to-date TDD uplink-downlink configuration notified in the received re-configuration command, the TDD uplink-downlink configuration in a current radio frame or in a next radio frame to perform uplink signal sending, downlink signal receiving, and the like. An uplink signal includes information such as a periodic sounding reference signal (SRS) and a periodic channel status indication (CSI) report sent on a physical uplink control channel (PUCCH).

When the UE determines, according to the up-to-date TDD uplink-downlink configuration, that an uplink subframe is already changed into a downlink subframe, for example, a subframe 4 is changed from an uplink subframe to a downlink subframe when a TDD uplink-downlink configuration is changed from 0 to 1, and a subframe 3 is changed from an uplink subframe to a downlink subframe when a TDD uplink-downlink configuration is changed from 0 to 2, the UE cannot send an uplink signal such as an SRS and a CSI in these subframes. When these subframes are changed from downlink subframes to uplink subframes, the UE sends the uplink signal in these subframes.

However, due to a limitation on a processing capability of the UE, some UE uses the up-to-date TDD uplink-downlink configuration at a relatively high speed, and some UE uses the up-to-date TDD uplink-downlink configuration at a relatively low speed. Consequently, when a subframe is changed from a downlink subframe to an uplink subframe, UE with a high processing speed may send an uplink signal in the subframe, but UE with a low processing speed does not send an uplink signal in the subframe. In this way, the base station cannot determine whether an uplink signal is sent in the uplink subframe. For example, the UE actually does not send an uplink signal, but the base station considers that the UE sends the uplink signal, and therefore, decodes the uplink signal. Alternatively, the UE actually sends an uplink signal, but the base station considers that the UE does not send the uplink signal, and therefore, does not receive the uplink signal. On one hand, decoding complexity is affected. On the other hand, incorrect decoding causes the base station to make an incorrect decision, and affects system performance.

Figure 5:
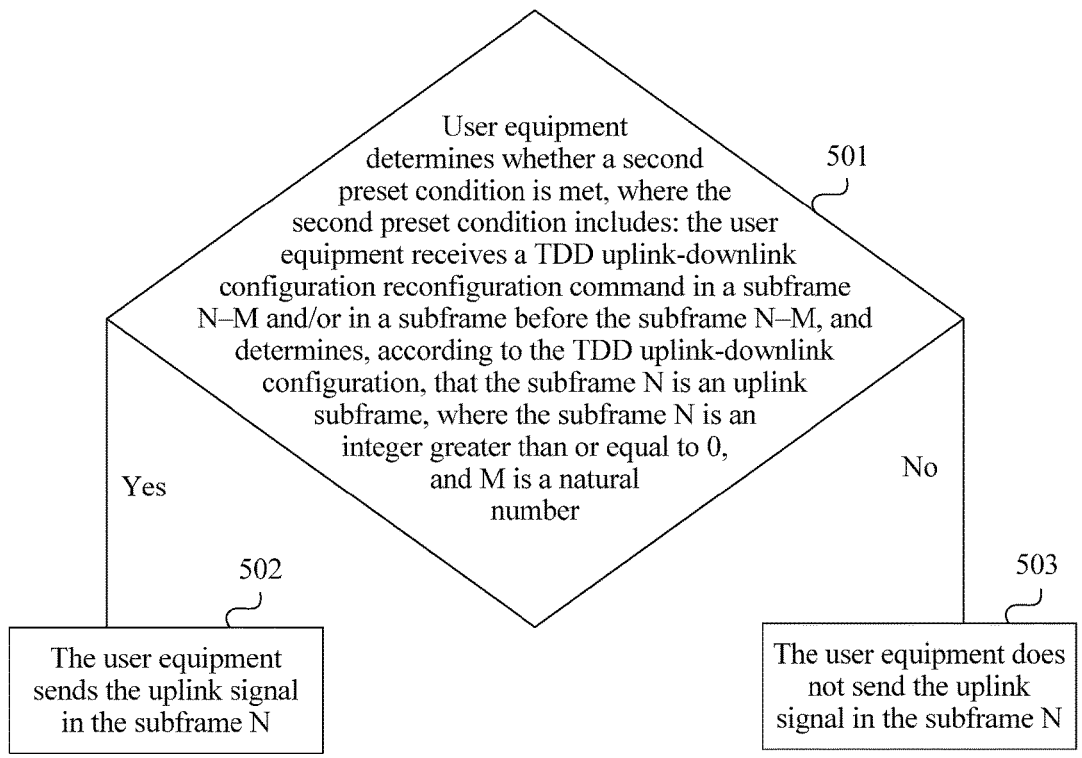
FIG. 5 is a flowchart of a method for optimizing uplink signal sending according to an embodiment.

FIG. 5 is a flowchart of a method for optimizing uplink signal sending according to an embodiment. As shown in FIG. 5, the method includes the following steps.

501. UE determines whether a second preset condition is met, where the second preset condition includes: the UE receives a TDD uplink-downlink configuration reconfiguration command in a subframe N-M and/or in a subframe before the subframe N-M, and determines, according to the TDD uplink-downlink configuration, that the subframe N is an uplink subframe, where the N is an integer greater than or equal to 0, and M is a natural number. If the second preset condition is met, go to step 502; if the second preset condition is not met, go to step 503.

502. The UE sends the uplink signal in the subframe N.

503. The UE does not send the uplink signal in the subframe N.

Specifically, the technical solutions provided in this embodiment of the present invention may be applied to various wireless communications networks.

Optionally, a value of M may be 5, so as to adapt to different capabilities of different UE. Certainly, the present invention sets no limitation on a specific value of M. The value of M may be configured by using a broadcast message or a dedicated message, or may be pre-configured in a protocol.

M=5 is used as an example. It is assumed that a period in which a TDD uplink-downlink configuration changes is 10 ms, and it is assumed that a TDD uplink-downlink configuration used by the UE in a previous radio frame is 1. A TDD uplink-downlink configuration 0 indicated in a TDD uplink-downlink configuration reconfiguration command is received in a subframe 0 of a current radio frame, and the UE may learn, according to the uplink-downlink configuration, that a subframe 4 of the current radio frame is an uplink subframe. Because the subframe 0 of the current radio frame is later than a subframe 4-5 (that is, a subframe 9 of the previous radio frame) of the current radio frame, the UE does not send the uplink signal in the subframe. If the UE receives, in a subframe 6 of the previous radio frame, a TDD uplink-downlink configuration 0 indicated in a TDD uplink-downlink configuration reconfiguration command, the UE may learn, according to the uplink-downlink configuration, that a subframe 4 of the current radio frame is an uplink subframe. Because the subframe 6 of the previous radio frame is earlier than a subframe 4-5 (that is, a subframe 9 of the previous radio frame) of the current radio frame, the UE sends the uplink signal in the subframe.

Optionally, the uplink signal includes at least one of the following signals: a periodic sounding reference signal, or a periodic channel quality indication reporting signal, or a periodic channel status indication reporting signal.

Optionally, a physical resource for sending the uplink signal is configured in the subframe N.

Optionally, the value of M may be configured by using a broadcast message or a dedicated message, or may be pre-configured in a protocol.

According to the method for optimizing uplink signal sending that is provided in this embodiment, a problem of inconsistency between uplink signal sending and receiving that is caused by an uplink-downlink change of a subframe can be alleviated or avoided, so as to reduce receiving complexity and improve system performance.

Figure 6:
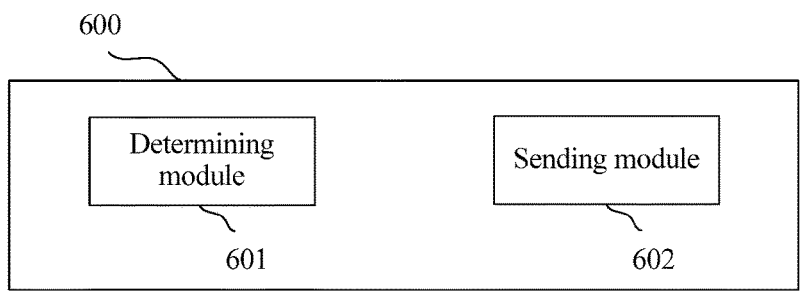
FIG. 6 is a schematic structural diagram of an apparatus for optimizing uplink signal sending according to an embodiment.

FIG. 6 is a schematic structural diagram of an apparatus for optimizing uplink signal sending according to an embodiment. As shown in FIG. 6, an apparatus 600 for optimizing uplink signal sending according to this embodiment includes the following steps.

a determining module 601, configured to determine whether a second preset condition is met, where the second preset condition includes: UE receives the TDD uplink-downlink configuration reconfiguration command in a subframe N-M and/or in a subframe before the subframe N-M, and determines, according to the TDD uplink-downlink configuration, that the subframe N is an uplink subframe, where the subframe N is an integer greater than or equal to 0, and M is a natural number; and a sending module 602, configured to: send the uplink signal in the subframe N if the determining module 601 determines that the second preset condition is met; or not send the uplink signal in the subframe N if the determining module 601 determines that the second preset condition is not met.

The apparatus 600 for optimizing uplink signal sending that is provided in this embodiment may be used to execute the technical solutions of the method for optimizing uplink signal sending that is shown in FIG. 5, and implementation principles and technical effects of the apparatus 600 are similar to those of the method, and details are not described herein.

It should be noted that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In the foregoing embodiments, the description of each embodiment has respective focuses. For a part that is not described in detail in an embodiment, reference may be made to related descriptions in other embodiments. In addition, relational terms such as first and second are only used to distinguish one entity from another, and do not necessarily require or imply that any actual relationship or sequence exists between these entities.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
in response to a previous random access attempt process failing, selecting, from enhancement levels of an enhancement mode, a next enhancement level of an enhancement level used in the previous random access attempt process;
when a pre-obtained random access channel resource corresponding to the next enhancement level is available at a current moment, and in response to the current moment occurring after a start moment of the pre-obtained random access channel resource corresponding to the next enhancement level, determining whether a preset policy is met; and
when it is determined that the preset policy is met, sending, at the current moment, a random access code, wherein signal retransmission times corresponding to the next enhancement level are more than signal retransmission times corresponding to the enhancement level used in the previous random access attempt process.

2. The method according to claim 1, wherein the preset policy comprises:
an interval between the current moment and the start moment of the pre-obtained random access channel resource corresponding to the next enhancement level is less than or equal to a first preset interval, wherein the first preset interval is fixed in a protocol.

3. The method according to claim 1, wherein the preset policy comprises:
an interval between the current moment and an end moment of the pre-obtained random access channel resource corresponding to the next enhancement level is greater than or equal to a second preset interval, wherein the second preset interval is fixed in a protocol.

4. The method according to claim 1, wherein after sending the random access code, the method further comprises:
using a random access response parameter pre-configured by a network device to attempt to receive a random access response message sent by the network device;
when the random access response message is not received, determining that the current random access attempt process fails; and
when the random access response message is successfully received, performing the following:
sending a scheduled transmission message to the network device using a resource that is occupied by the scheduled transmission message and that is pre-configured by the network device;
using a resource that is occupied by a contention resolution message and that is pre-configured by the network device to attempt to receive the contention resolution message indicating a random access success; and
when the contention resolution message is not received, determining that the current random access attempt process fails.

5. The method according to claim 1, further comprising:
when a random access procedure is initiated for a first time, determining a signal transmission mode for sending the random access code, wherein the signal transmission mode is a single transmission mode or the enhancement mode;
obtaining a random access parameter that corresponds to the determined signal transmission mode and that is pre-configured by a network device; and
sending the random access code to the network device using the obtained random access parameter.

6. The method according to claim 1, wherein the preset policy comprises:
an interval between the current moment and the start moment of the pre-obtained random access channel resource corresponding to the next enhancement level is less than or equal to a first preset interval, wherein the first preset interval is configured by a network device.

7. The method according to claim 1, wherein the preset policy comprises:
an interval between the current moment and a end moment of the pre-obtained random access channel resource corresponding to the next enhancement level is greater than or equal to a second preset interval, wherein the second preset interval is configured by a network device.

8. The method according to claim 1, wherein whether the preset policy is met depends on a number of possible transmission times between the current moment and an end moment of the pre-obtained random access channel resource.

9. A device, comprising:
a non-transitory memory storing instructions; and
a processor, coupled to the non-transitory memory, the processor being configured to execute the instructions to:
in response to a previous random access attempt process failing, selecting, from enhancement levels of an enhancement mode, a next enhancement level of an enhancement level used in the previous random access attempt process;
when a pre-obtained random access channel resource corresponding to the next enhancement level is available at a current moment, and in response to the current moment occurring after a start moment of the pre-obtained random access channel resource corresponding to the next enhancement level, determining whether a preset policy is met; and
when it is determined that the preset policy is met, sending, at the current moment, a random access code, wherein signal retransmission times corresponding to the next enhancement level are more than signal retransmission times corresponding to the enhancement level used in the previous random access attempt process.

10. The device according to claim 9, wherein the preset policy comprises:
an interval between the current moment and the start moment of the pre-obtained random access channel resource corresponding to the next enhancement level is less than or equal to a first preset interval, wherein the first preset interval is fixed in a protocol.

11. The device according to claim 9, wherein the preset policy comprises:
an interval between the current moment and an end moment of the pre-obtained random access channel resource corresponding to the next enhancement level is greater than or equal to a second preset interval, wherein the second preset interval is fixed in a protocol.

12. The device according to claim 9, wherein the processor is further configured to execute instructions to:
use a random access response parameter pre-configured by a network device to attempt to receive a random access response message sent by the network device;
when the random access response message is not received, determine that the current random access attempt process fails; and
when the random access response message is successfully received, perform the following:
send a scheduled transmission message to the network device using a resource that is occupied by the scheduled transmission message and that is pre-configured by the network device;
use a resource that is occupied by a contention resolution message and that is pre-configured by the network device to attempt to receive the contention resolution message indicating a random access success; and
when the contention resolution message is not received, determine that the current random access attempt process fails.

13. The device according to claim 9, wherein the processor is further configured to execute instructions to:
when a random access procedure is initiated for a first time, determine a signal transmission mode for sending the random access code, wherein the signal transmission mode is a single transmission mode or the enhancement mode;
obtain a random access parameter that corresponds to the determined signal transmission mode and that is pre-configured by a network device; and
send the random access code to the network device by using the obtained random access parameter.

14. The device according to claim 9, wherein the preset policy comprises:
an interval between the current moment and the start moment of the pre-obtained random access channel resource corresponding to the next enhancement level is less than or equal to a first preset interval, wherein the first preset interval is configured by a network device.

15. The device according to claim 9, wherein the preset policy comprises:
an interval between the current moment and an end moment of the pre-obtained random access channel resource corresponding to the next enhancement level is greater than or equal to a second preset interval, wherein the second preset interval is fixed in a protocol or configured by a network device.

\* \* \* \* \*